US012730664B1

(12) United States Patent
Chong et al.

(10) Patent No.: US 12,730,664 B1
(45) Date of Patent: Sep. 8, 2026

(54) PAGE TAG-BASED MEMORY TRAP-AND-EMULATE OPERATIONS

(71) Applicant: Amazon Technologies, Inc., Seattle, WA (US)

(72) Inventors: Nathan Yong Seng Chong, Ponte Vedra, FL (US); Karimallah Ahmed Mohammed Raslan, Leander, TX (US)

(73) Assignee: Amazon Technologies, Inc., Seattle, WA (US)

( * ) Notice: Subject to any disclaimer, the term of this patent is extended or adjusted under 35 U.S.C. 154(b) by 578 days.

(21) Appl. No.: 18/334,311

(22) Filed: Jun. 13, 2023

(51) Int. Cl.
*G06F 9/455* (2018.01)

(52) U.S. Cl.
CPC ...... *G06F 9/45558* (2013.01); *G06F 9/45545* (2013.01); *G06F 2009/45583* (2013.01)

(58) Field of Classification Search
CPC ............. G06F 9/45558; G06F 9/45545; G06F 2009/45583
See application file for complete search history.

(56) References Cited

U.S. PATENT DOCUMENTS 5,574,873 A 11/1996 Davidian
7,571,090 B2 8/2009 Kinney
7,945,436 B2 5/2011 Ang
8,510,756 B1 8/2013 Koryakin
9,081,602 B1 7/2015 Omelyanchuk
9,213,567 B2 12/2015 Barde
9,286,095 B2 3/2016 Adams
9,317,452 B1 * 4/2016 Forschmiedt ....... G06F 9/45558
10,067,783 B2 9/2018 Adams
10,467,033 B2 11/2019 Tian
10,942,757 B2 * 3/2021 van Riel ............... G06F 9/4555
11,055,147 B2 * 7/2021 Kakaiya ................ H04L 51/226
11,237,981 B1 * 2/2022 Habusha ............. G06F 12/0835
2008/0005297 A1 * 1/2008 Kjos ....................... H04L 67/08
709/223
2012/0017027 A1 * 1/2012 Baskakov ........... G06F 11/1448
711/216
2018/0004539 A1 * 1/2018 Liguori ............... G06F 12/1009
2018/0246749 A1 * 8/2018 van Riel ............... G06F 9/5077
2019/0163902 A1 * 5/2019 Reid ....................... G06F 21/53
2021/0133001 A1 * 5/2021 Bono ...................... G06F 16/11
2021/0157601 A1 * 5/2021 Craske .................. G06F 9/4812

* cited by examiner

*Primary Examiner* — Dong U Kim
(74) *Attorney, Agent, or Firm* — Robert C. Kowert; Kowert, Hood, Munyon, Rankin & Goetzel, P.C.

(57) ABSTRACT

A hypervisor comprising a plurality of emulation routines is launched at a host. Individual emulation routines are used to perform respective tasks by a hypervisor on behalf of guest virtual machines of the host. A guest virtual machine initiates an operation which requires access to a virtual address. Subsequent to a determination by a memory management unit of the host that a virtual-to-physical address translation mapping for the virtual address which permits the operation initiated by the guest virtual machine is not available, a task is performed using a particular emulation routine, without initiating an analysis using the virtual address at the hypervisor to select the particular emulation routine from the plurality of emulation routines.

20 Claims, 12 Drawing Sheets

Translation table base register (TTBR) 302 a1

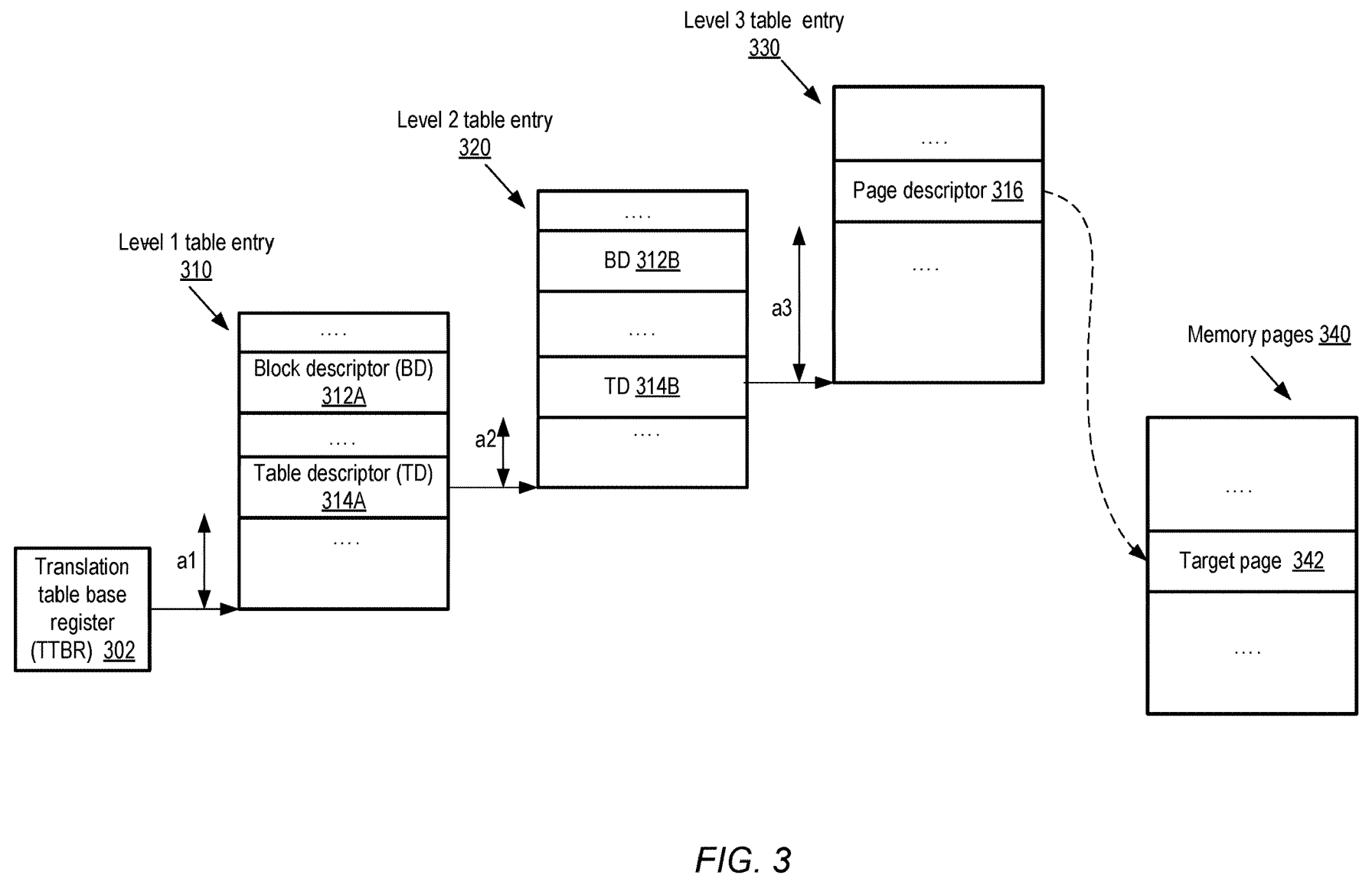

Level 1 table entry 310

Block descriptor (BD) 312A

Table descriptor (TD) 314A a2

Level 2 table entry 320

BD 312B

TD 314B a3

Level 3 table entry 330

Page descriptor 316

Memory pages 340

Target page 342

FIG. 3

Overhead 566 associated with selecting ER, incurred if virtual address-based computations are used, can potentially be reduced using page tags

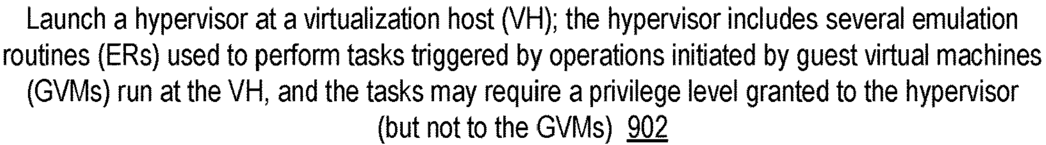

The hypervisor launches a GVM GVM1 at the VH, e.g., after setting up guest page table (including page tags at leaf-level entries) and doing other preparatory tasks 905

GVM1 initiates an operation (Op1, which may be a read or a write) that requires access to a virtual address VA1 908

A memory management unit (MMU) of a processor of the VH traverses guest page table entries and discovers that a valid virtual-to-physical address mapping for VA1 which permits Op1 is not present 911

The page tag is obtained from a page table entry associated with VA1, and is used to perform a task of the emulation routine ER1 corresponding to VA1 at the hypervisor; ER1 is selected from among the multiple ERs without performing VA1-based computations at the hypervisor, thereby reducing overhead 914

*FIG. 9*

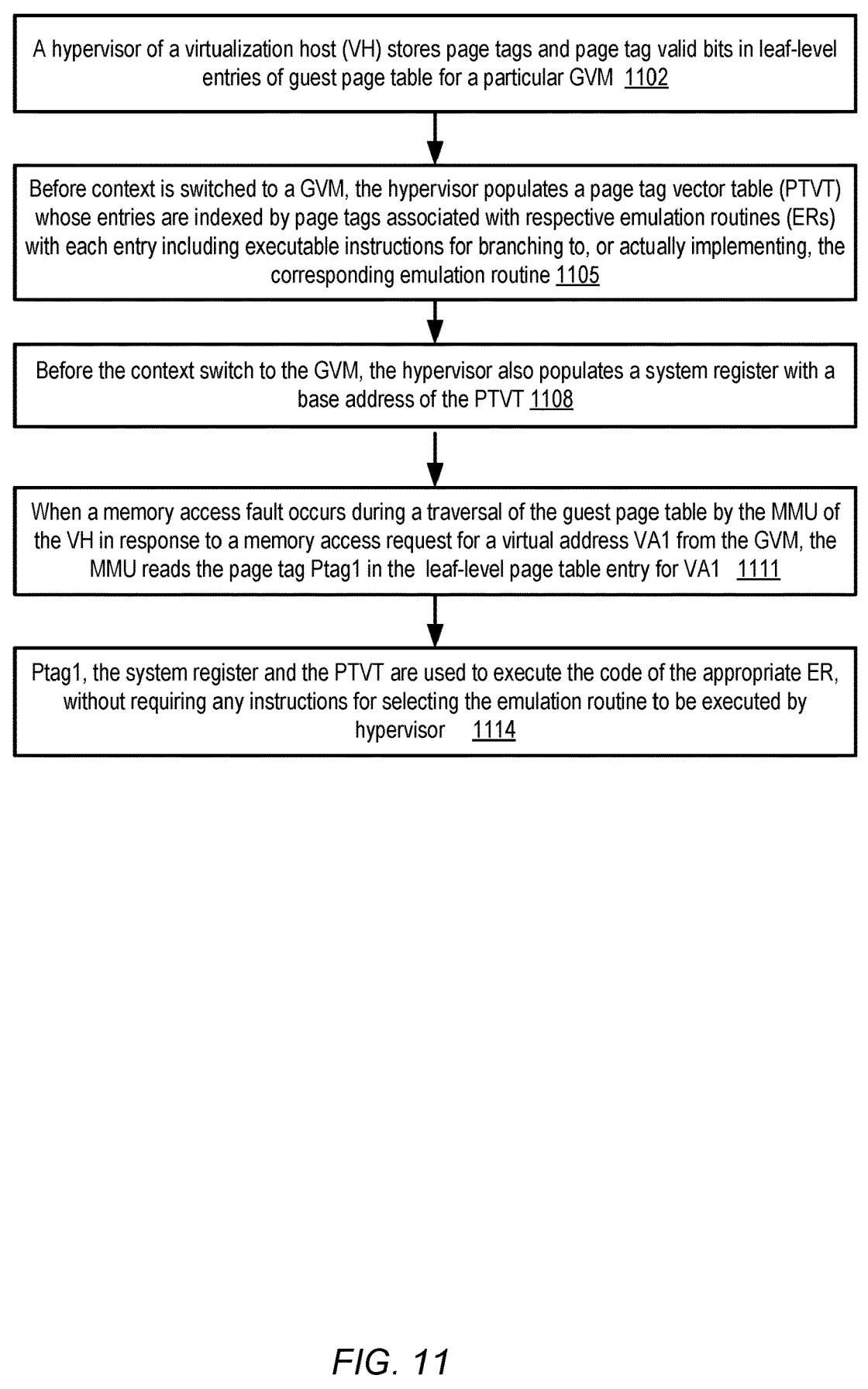

A hypervisor of a virtualization host (VH) stores page tags and page tag valid bits in leaf-level entries of guest page table for a particular GVM 1102

Before context is switched to a GVM, the hypervisor populates a page tag vector table (PTVT) whose entries are indexed by page tags associated with respective emulation routines (ERs) with each entry including executable instructions for branching to, or actually implementing, the corresponding emulation routine 1105

Before the context switch to the GVM, the hypervisor also populates a system register with a base address of the PTVT 1108

When a memory access fault occurs during a traversal of the guest page table by the MMU of the VH in response to a memory access request for a virtual address VA1 from the GVM, the MMU reads the page tag Ptag1 in the leaf-level page table entry for VA1 1111

Ptag1, the system register and the PTVT are used to execute the code of the appropriate ER, without requiring any instructions for selecting the emulation routine to be executed by hypervisor 1114

*FIG. 11*

PAGE TAG-BASED MEMORY TRAP-AND-EMULATE OPERATIONS

BACKGROUND

As virtualization techniques have improved in recent years, more and more applications are being run on virtual machines executed on virtualization hosts, such as compute instances provided by cloud-based computing services. Several virtual machines can be run on a given virtualization host, with each virtual machine comprising its own operating system and application programs. A virtualization host typically includes a hypervisor which acts as an intermediary between the software of the virtual machines and the hardware of the host. For certain types of operations attempted by programs running on a virtual machine, such as accesses to some hardware subcomponents of the host, respective emulation routines are typically executed by the hypervisor. Depending on the particular mix of workloads run on virtual machines, a hypervisor can incur non-trivial overhead, which can negatively impact application performance, due to the need to identify which emulation routines are to be run.

BRIEF DESCRIPTION OF DRAWINGS

FIG. 3 illustrates an example multi-level page table which may be traversed frequently by a hardware memory management unit (MMU) of a computer system to perform virtual-to-physical address translation, according to at least some embodiments.

FIG. 9 is a flow diagram illustrating aspects of example tasks that may be performed to handle memory trap-and-emulate operations without using virtual address based computations at a hypervisor to select emulation routines, according to at least some embodiments.

FIG. 11 is a flow diagram illustrating aspects of an example technique in which page tags and a vector table are used to execute emulation routines of a hypervisor, according to at least some embodiments.

Figure 1:
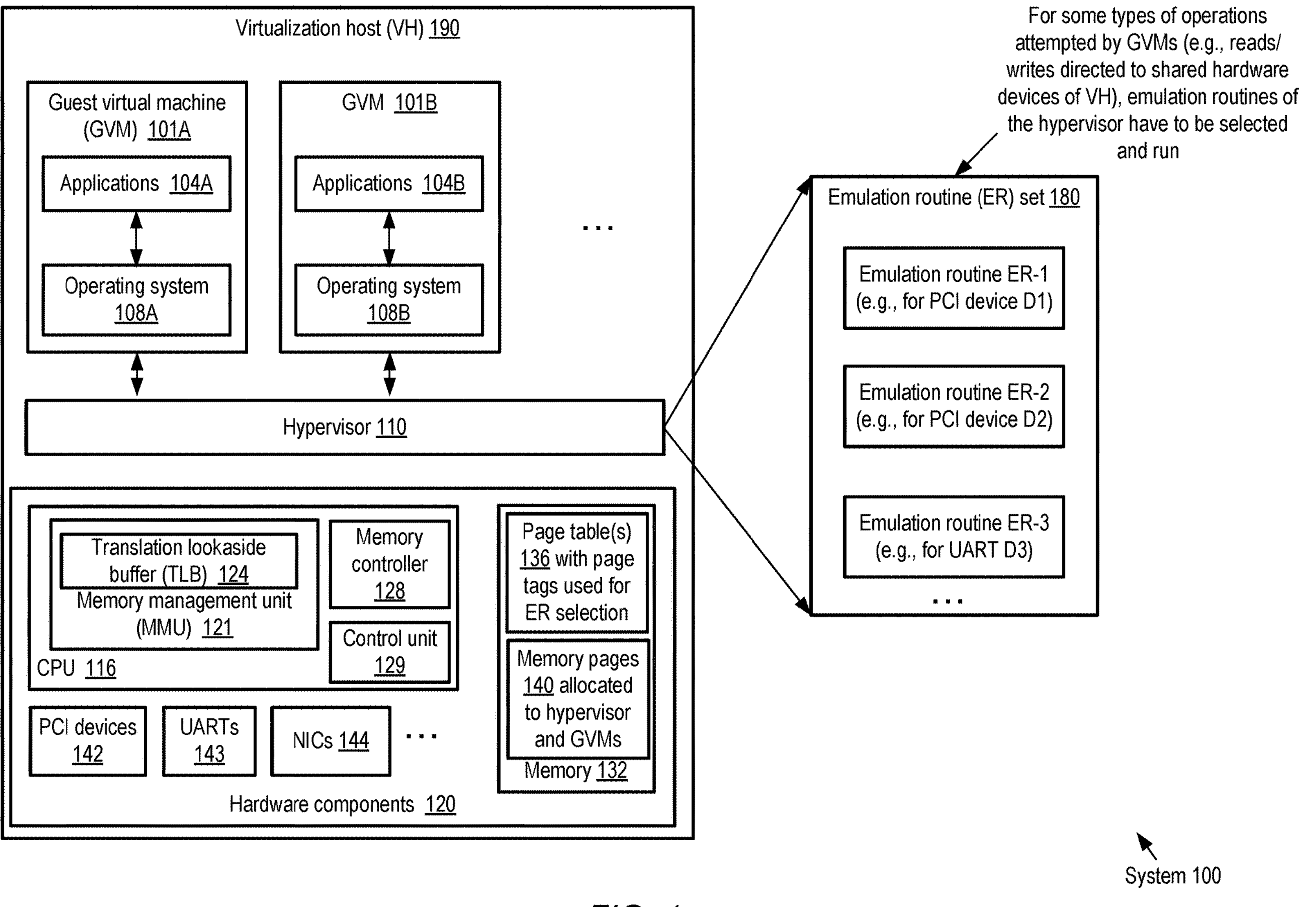
FIG. 1 illustrates an example system environment in which page tags may be employed for efficient selection of emulation routines of a hypervisor for memory trap-and-execute operations at a virtualization host, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for reducing the overhead associated with performing memory trap-and-emulate operations at virtualization hosts. Virtualization hosts (VHs) typically comprise virtualization management software, referred to as a hypervisor, which acts as an intermediary between the software running within guest virtual machines (GVMs) of the VHs and various hardware components and devices (e.g., peripheral devices, persistent storage devices, etc.) of the VHs which may have to be shared among multiple GVMs. Even though multiple GVMs may actually be running on the virtualization host concurrently, the hypervisor may be responsible for providing the operating system (OS) of each GVM the abstraction that the hardware components of the VH are available for exclusive use by that OS. The OS of a given GVM may in turn be responsible for providing other programs running within that GVM a similar abstraction. To help fulfill its responsibilities, the hypervisor typically includes a set of emulation routines. These emulation routines (ERs) (which can also be referred to as emulation functions or emulation methods) are invoked when a GVM program initiates an operation that requires the hypervisor to intervene, e.g., when the GVM program attempts to write to a virtual hardware device that is emulated by the hypervisor. Such a virtual hardware device may not actually exist physically in the VH, but the hypervisor may nevertheless provide, using a software construct, the appearance to a GVM that the device does exist and that input/output operations to the device can therefore be initiated from the GVM. The term "trap-and-emulate" (TAE) refers to the ability of a hypervisor to interpose its behavior under such circumstances. The GVM's execution is temporarily stopped when an operation requiring ER execution is attempted, and the hardware context switches to the hypervisor (this is the "trap" portion of TAE). An appropriate ER of the hypervisor is then selected and executed (this is the "emulate" part of TAE).

There are several categories of hypervisor TAEs, including memory trap-and-emulate (MTAE). MTAE operations are typically performed when a GVM initiates an operation, such as a load or store directed to a virtual address within the hypervisor-managed virtual memory space assigned to the GVM, for which a valid virtual-to-physical address translation mapping which permits the requested operation is not found by a memory management unit (MMU) of a processor of the VH. These types of scenarios can be referred to as "memory access faults". In general such faults can occur either because a valid address translation mapping is not present in a set of address translation entries (such as a page table set up by the hypervisor for the GVM) traversed by the MMU, or because a valid address translation mapping is present but the permission settings indicated in the mapping do not provide the required permission. In some traditional virtualization implementations, in the event of a memory access fault, the MMU stores the fault-causing virtual address (the virtual address for which the valid mapping with the needed permission for the requested operation was not found) in a system register accessible to the hypervisor. The hypervisor then reads the fault-causing virtual address from the system register and performs computations using that virtual address (e.g., a case-based lookup, or an interval-tree-based lookup) to identify the particular ER, selected from several ERs of the hypervisor, which should be invoked to complete or fulfill the operation that was initiated by the GVM. The code for selecting the ER using the virtual address can be included within a hypervisor routine, function or method referred to as a data abort handler. The selected ER is then executed. Performing the virtual address based computations (e.g., comparisons or other types of arithmetic using 64-bit values) represents overhead that is incurred at the hypervisor for selecting the ER in such traditional virtualization implementations. Depending on the frequency with which such ER selection is required for a given GVM (which in turn depends on the kinds of applications being run at the GVM, the kinds of hardware devices available at the VH, and/or other factors), the cumulative overhead of virtual address-based ER selection at a hypervisor can result in a non-trivial negative impact on application performance. For example, the processor cycles consumed for the ER selection could otherwise have been used for the applications, and the latencies for the GVM operations that lead to the MTEAs could increase.

In order to help reduce or avoid such negative performance impacts, one or more "page tag" based schemes for ER selection may be implemented in some embodiments. At a high level, the schemes work as follows. A respective small value (e.g., a 4-bit value or an 8-bit value) referred to as a page tag may be associated with or mapped to each ER. For example, page tag Ptag1 may be assigned to an ER ER-A, page tag Ptag2 may be assigned to another ER ER-B, and so on. The page tags may be stored by the hypervisor, as part of the hypervisor's preparatory tasks associated with GVM launches, in the address translation data structures (e.g., within leaf-level entries of page tables, and/or within translation lookaside buffers (TLBs)) that are accessed by the MMU when it attempts to perform virtual-to-physical memory translations. When an MMU determines that a valid virtual-to-physical address translation mapping for an operation directed to a virtual address VA1 from a GVM which allows the requested operation is not available (i.e., that a memory access fault should occur), the MMU accesses the page tag (which can be referred to as Ptag-fault) corresponding to VAL. In some cases, the memory access-related fault may occur because there is no valid virtual-to-physical address translation mapping; in other cases there may be a valid mapping, but the permissions indicated for VA1 in the address translation data structure containing the valid mapping may not allow the requested type of task or operation to be performed.

Ptag-fault may be used in one of several ways to more efficiently identify the ER which should be executed, without requiring virtual address-based computations (i.e., computations whose input includes VA1 itself) to be performed at the hypervisor. For example, the MMU may provide Ptag-fault to the hypervisor via a system register, and the hypervisor may select the ER using Ptag-fault in some embodiments. In other embodiments, Ptag-fault may be used as an index or pointer into a vector table set up by the hypervisor for the GVM, with the entry in the vector table which is indexed by Ptag-fault comprising executable instructions corresponding to the appropriate ER (such as a jump instruction which leads to the execution of the appropriate ER, or instructions that actually implement the logic of the appropriate ER). In some embodiments, the page tags (and associated page tag validity indicator bits) can be stored within portions of the address translation data structure entries that are currently not being used for any other purpose (e.g., "reserved" bits specified in the hardware architecture), so no memory overhead may be incurred for storing the page tags themselves. By avoiding the execution of virtual address based computations, page tag based ER selection techniques may substantially reduce the computational overhead associated with MTAEs, and thereby help bring the performance achieved by applications running at GVMs closer to the performance that could have been achieved if the applications were instead run on non-virtualized hosts.

As one skilled in the art will appreciate in light of this disclosure, certain embodiments may be capable of achieving various advantages, including (a) a reduction in the computational overhead associated with MTAEs by avoiding the execution of virtual address based computations for ER selection at hypervisors, thereby freeing up more processor cycles for applications running at GVMs and/or (b) a reduction in latencies for completing GVM operations that lead to MTAEs.

According to some embodiments, a computer-implemented method may comprise launching or instantiating, at a VH, a hypervisor comprising a plurality of ERs. Individual ones of the emulation routines may be used to perform respective tasks (such as writes or reads to/from peripheral devices shared among multiple GVMs) triggered by corresponding operations initiated at one or more GVMs run at the virtualization host. The VH may comprise one or more processors with respective MMUs. The GVMs themselves may be launched by the hypervisor, e.g., in response to commands or requests received at the hypervisor from an administrator or from a control plane server of a virtualized computing service (VCS). The tasks performed by the hypervisor on behalf of the GVMs may require a high privilege level or set of permissions which is granted to the hypervisor (and not granted to the GVMs). Individual ones of the tasks may be associated with a corresponding hardware subcomponent of the VH in various embodiments.

The method may further comprise initiating, by a particular GVM which was launched at the virtualization host by the hypervisor, an operation which requires access to a particular virtual address VAL. An MMU of a processor of the VH may attempt to find a virtual-to-physical address translation mapping corresponding to VA1, e.g., by traversing address translation entries of a page table set up by the hypervisor for the particular GVM in various embodiments. The MMU may determine that a valid virtual-to-physical address translation mapping for VA1 which grants permission for the operation initiated by the GVM is not present in the set of address translation entries associated with the particular GVM.

In various embodiments, based at least in part on (a) the determination by the MMU that the valid virtual-to-physical address translation mapping for the VA1 is not present and (b) a page tag Ptag1 associated with VA1 and identified by the MMU, a task using a particular ER of the plurality of ERs may be performed. The particular ER may be executed without the hypervisor utilizing VA1 to choose the particular ER, i.e., the hypervisor may not have to perform a computation whose input includes VA1 to select the particular ER from the plurality of ERs. Any of several approaches may be used to determine which ER should be executed in different embodiments as described below. In some embodiments, the hypervisor may use a simple case statement to which Ptag1 is provided as input to select the ER; in other embodiments, an entry in a vector table, identified using Ptag1, may be used to execute the ER.

According to at least some embodiments, the hypervisor may store Ptag1 in an address translation entry of the set of address translation entries associated with the particular GVM and traversed by the MMU. The hypervisor may store such page tags, for example, in leaf-level entries of a page table set up by the hypervisor for the GVM shortly before the GVM is launched, as part of the preparatory tasks performed for GVM launches by the hypervisor. Such a page table, comprising virtual-to-physical address translation mappings for the GVM, may be referred to as a hypervisor-managed page table. In some embodiments, page tags corresponding to one or more ERs may be stored in page table entries later in the lifecycle of the GVM; that is, not all page tags may be stored at the time that page tables are set up. In some implementations, reserved bits within page table entries may be used to store page tags. In at least some embodiments, the hypervisor may also set a page tag valid bit in a page table entry to indicate whether the bits that are used for the page tag in that page table entry currently contain a valid page tag or not. If the MMU determines that the page table entry corresponding to a virtual address which led to a memory access fault does not include a valid page tag, a traditional virtual address-based computation (e.g., as part of a conventional data abort handler) may be used to select the ER to be executed in at least some embodiments.

In one embodiment, the MMU may read the page tag Ptag1 from a particular address translation entry in response to determining that the valid virtual-to-physical address translation mapping is not present, and store Ptag1 in a particular system register of the VH. Ptag1 may then be read from that system register by the hypervisor. The hypervisor may then use Ptag1 to select the particular ER which is to be executed. In other embodiments, a location other than a system register, accessible to the hypervisor, may be used by the MMU to share Ptag1 with the hypervisor. In some embodiments, page tags may be used to speed up MTAEs without the help of MMUs. In such an embodiment, the hypervisor may still populate address translation entries with page tags as described above. To discover the page tag of a faulting virtual address without the help of the MMU, the hypervisor may traverse the page table itself (in an analogous manner to the way that the MMU would traverse the page table), using a sequence of load operations.

According to some embodiments, the hypervisor may populate a vector table in the memory of the VH, e.g., just before context is switched to the particular GVM. The vector table may comprise a plurality of vector table entries indexed by respective page tags including Ptag1. Individual ones of the vector table entries may comprise executable instructions for initiating execution of respective ERs of the plurality of ERs of the hypervisor. The plurality of vector table entries may include a particular vector table entry, which is indexed by or pointed to by Ptag1, and corresponds to the particular ER. The hypervisor may also store a base address BA of the vector table in a system register in such embodiments. In some implementations, the system register may also include a vector table validity indicator bit, used by the hypervisor to indicate whether the system register is currently pointing to a valid vector table or not. If the vector table validity bit is set to 1 by the hypervisor, for example, this may indicate to the VH hardware that the vector table based approach is to be used to execute ERs in one implementation; if the vector table validity bit is set to 0 by the hypervisor, this may be a signal to the hardware that the vector table technique is not to be used. When the MMU discovers that a valid address translation entry corresponding to VA1 is not present, Ptag1 may be read by the MMU, and the vector table entry corresponding to the ER which is to be executed may be accessed and executed using Ptag1. For example, a subcomponent of the processor hardware responsible for determining which instructions are to be executed next may use BA to determine where in memory the vector table resides, and Ptag1 to identify the vector table entry corresponding to the ER which should be executed. The portion of the processor hardware which determines which instructions should be executed next may be referred to by various names, depending on the hardware architecture, including “control unit”, “execution control unit”, “front-end” and the like. The control unit or front-end subcomponent may cause the hypervisor task needed to fulfill or complete the operation initiated at the GVM to be executed at the processor using at least the instructions included in the vector table entry indexed by Ptag1. Note that even in the alternative scheme outlines above in which the hypervisor obtains Ptag1 from the MMU and then uses Ptag1 to choose the ER which is to be executed, the control unit is the hardware subcomponent that eventually causes the ER to be executed (just as it causes any sequence of instructions to be executed); as such, the control unit participates in the MTAE regardless of the specific way in which Ptag1 is utilized.

The page tag based techniques for MTAEs may be employed to handle many different kinds of operations initiated at GVMs in different embodiments. Such operations may include, among others, a read or write operation directed to a Universal Asynchronous Receiver-Transmitter (UART) device, a read or write operation directed to a Peripheral Component Interconnect (PCI) device, or a read or write operation directed to a portion of virtual memory which has not yet been mapped to physical memory of the host by the hypervisor.

According to one embodiment, a computing device may include an MMU and a control unit (CU). The MMU may be configured to determine a particular virtual address to which access is required for an operation initiated by a GVM running at the computing device. The MMU may further determine, based at least in part on a traversal of a set of address translation entries of the computing device, that a valid virtual-to-physical address translation mapping which permits the operation initiated by the GVM is not available for the particular virtual address. The MMU may identify a page tag associated with the virtual address, e.g., from an address translation entry accessed during the traversal. The CU may cause a particular ER of a plurality of ERs of a hypervisor of the computing device to be executed to complete the operation initiated by the GVM, with the particular ER being selected from the plurality of ERs based at least in part on the page tag.

FIG. 1 illustrates an example system environment in which page tags may be employed for efficient selection of emulation routines of a hypervisor for memory trap-and-execute operations at a virtualization host, according to at least some embodiments. As shown, system 100 includes a virtualization host (VH) 190 at which a hypervisor 110 performs various types of virtualization management tasks to support guest virtual machines (GVMs) such as GVM 101A and GVM 101B. Each GVM may include an operating system (such as operating system 108A or 108B) and a set of applications (such as applications 104A or 104B). The hypervisor and the GVMs may collectively comprise the software components of the VH in the depicted embodiment.

Hardware components 120 of the VH 190 may include one or more CPUs such as CPU 116, a memory 132, PCI devices 142, UARTs 143, network interface cards or NICs 144, and the like. Conceptually, the hypervisor may be considered an intermediary between the software and the hardware components, responsible for example for ensuring that concurrent requests to write to the same hardware device from different GVMs are handled correctly without errors, ensuring that shared hardware resources are not monopolized by any single GVM, and so on. The CPU may include an MMU 121, which in turn may include a TLB 124 in some implementations. The CPU may also include a memory controller 128 and a control unit 129. The control unit may be responsible for, among other tasks, identifying the instructions to be executed next at the CPU. Physical memory 132 may be made up of one or more devices (such as Dynamic RAM devices), each such device organized as an array of memory cells. Each cell (which may comprise, for example, a byte with eight bits) has a unique physical address. Physical memory addresses are typically unique within the entire computing device, while the virtual memory address space assigned to a given GVM by the hypervisor is unique to that GVM. Note that the hypervisor may in some cases map different virtual memory addresses of respective GVMs to the same physical memory address.

In system 100, only the hypervisor may be permitted to use or have access to physical memory addresses directly; programs (including operating systems) of the GVMs must use virtual addresses exclusively. Translation from virtual to physical addresses may be accomplished using a combination of memory managers within the hypervisor, address translation hardware in the MMU, and one or more types of page tables 136 (which may be stored in memory 132 or in persistent storage devices such as disks not shown in FIG. 1). The memory may comprise memory pages 140 (e.g., with each page comprising some number of kilobytes of memory, such as 8 kilobytes, 16 kilobytes etc., with page sizes being chosen by the hypervisor) allocated to GVMs.

In at least some embodiments, three types of memory address spaces may be managed at a VH, using two types of page tables. The memory address spaces may be referred to respectively as guest virtual address spaces (GVAs) (one of which may be set up per program running at each GVM), guest "physical" address spaces (GPAs) (one per GVM), and a host physical address space (HPA) (one per VH). GVAs may sometimes be referred to as "Virtual Address Spaces"; GPAs may sometimes be referred to as "Intermediate Physical Address Spaces", while HPAs may sometimes be referred to as "Physical Address Spaces". The OS of a given GVM may be responsible for providing each program of the GVM a respective GVA, and organizing GVA-to-GPA translations, e.g., using a first type of page table which may be referred to as an OS-managed page table. The hypervisor may be responsible for providing each GVM a respective GPA. Addresses within a given GPA may need to be translated to true physical addresses of the HPA; as such, despite the use of word "physical" in the name and the illusion provided to the GVM OSs that the GPA addresses correspond to frames of physical memory, addresses within a GPA may in fact be virtual from the perspective of the hypervisor. Each GPA-to-HPA translation may be organized by the hypervisor, e.g., using a second type of page table referred to as a hypervisor-managed page table (one such hypervisor-managed page table may be set up for each GVM). GVA-to-GPA translations may be referred to as "Stage-1" translations, while GPA-to-HPA translations may be referred to as "Stage-2" translations in some embodiments. The page tag based techniques described herein may be performed using page tags stored in entries within hypervisor-managed page tables in various embodiments. The virtual addresses used to traverse hypervisor-managed page tables may be addresses within a GVM's GPA, and the target addresses identified using the hypervisor-managed page tables may be addresses within the HPA. Page tables created and managed by the GVM OS may not be utilized in the page tag based techniques introduced herein.

Conceptually, a given page table 136 may be described as mapping virtual page numbers or page addresses to physical page numbers (also referred to as frame numbers); as discussed below in further detail, page tables may often be implemented as tree structures that are traversed (typically very frequently) by the MMU to determine the physical address corresponding to a given virtual address within the address space of a given GVM. To speed up address translation, a translation lookaside buffer (TLB) 124 may be used to cache frequently-used or recently-used virtual-to-physical address translation mappings in some embodiments. After a physical page number corresponding to a virtual page address is determined by the MMU (using the TLB, or using the page table), the memory controller may be utilized to access the contents of the physical page in various embodiments.

A page table may comprise a plurality of entries of different types in some embodiments, as discussed below in the context of FIG. 3. While some portions of a hypervisor-managed page table entry may comprise memory address information (e.g., addresses of entries at other levels of the page table, or addresses of "physical" pages), other portions may comprise attributes associated with memory address ranges, such as access permissions and the like, and still other portions may comprise so-called reserved or unused bits. In at least one embodiment, a hypervisor may use such reserved bits to store page tags and/or page tag validity indicators as described below in further detail.

A hypervisor 110 may include an emulation routine (ER) set 180 comprising numerous emulation routines in the depicted embodiment. For some types of operations attempted or initiated by GVMs (e.g., by operating systems or application programs of the GVMs), such as reads or writes directed to shared hardware devices of the VH, or reads/writes directed to portions of virtual memory that have not yet been mapped to physical memory, a corresponding ER may have to be selected and run in various embodiments. For example, emulation routine ER-1 may be used to perform hypervisor tasks related to a particular PCI device D1 of the VH, emulation routine ER-2 may be used to perform hypervisor tasks related to another PCI device D2 of the VH, while ER-3 may be used to perform hypervisor tasks associated with a UART D3 in the scenario shown in FIG. 1.

The hypervisor 110 may be launched at the VH after the VH is powered up, e.g., in response to commands issued by an administrator (e.g., via a system console of the VH), or as part of the boot process of the VH. In some embodiments in which the VH is part of a fleet of virtualization servers of a computing service of a cloud computing environment, the functionality of the hypervisor may be split between a virtualization management offloading card and one or more software processes running on the CPU 116. GVMs may be launched by the hypervisor in response to commands from the administrator, and/or in response to commands sent from a control plane server of a computing service. Before a given GVM is launched or instantiated, the hypervisor may perform a set of preparatory tasks in the depicted embodiment. These tasks may include, among others, setting up a respective hypervisor-managed page table for individual ones of the GVMs. A hypervisor-managed page table for a given GVM may comprise at least some entries, populated by the hypervisor, which translate virtual addresses (from within a GPA in the terminology used above) of the GVM, assigned to the GVM by the hypervisor) to physical addresses (within an HPA in the terminology used above). Some of the virtual addresses may be used by the GVM programs to access hardware devices such as PCI devices, UARTs, etc. For example, the hypervisor may map a virtual address page to a particular PCI device, enabling the GVM programs to read and write the particular PCI device using a virtual address within that page. When a read or write instruction or operation directed to such a virtual address is issued by the GVM, the MMU may attempt to look up a corresponding virtual-to-physical address translation entry in the hypervisor-managed page table for the GVM. If a page table entry which is valid (as indicated for example by a valid bit) and permits the requested operation (as indicated by a permissions field within the entry) is not found, an MTAE may be performed. By design, in some embodiments, MTAEs may be required when GVMs attempt to access certain types of hardware devices; that is, the hypervisor may populate the page table entries in such a way that an MTAE has to be performed (that is, that the MMU is not able to find a valid mapping with the required permissions).

In at least some embodiments, the hypervisor may include code that maps respective ERs (such as ER-1, ER-2, etc.) used for MTAEs to respective page tags (e.g., numeric values which require a small number of bits for representation). The page tag corresponding to the ER that would need to be executed when a memory access fault occurs may be stored in the page table entry corresponding to the fault-causing virtual address as part of the page table preparation procedure of the hypervisor. When an MMU determines that a memory access fault has occurred in response to an operation initiate at a GVM, the corresponding page tag may easily be obtained by the MMU. The page tag may then be used to choose the particular ER to be executed, without performing computations or analysis at the hypervisor using the virtual address which led to the page fault in the depicted embodiment. In some cases, the MMU may provide the page tag to the hypervisor, and the hypervisor may then perform a simple lookup using the page tag to determine which ER to execute, as described below in further detail. In other cases, a vector table indexed via page tags, comprising entries with executable instructions associated with the ERs, may be set up by the hypervisor and used to eliminate the ER selection-related computations at the hypervisor entirely, as also described below in further detail. By avoiding computations using virtual addresses, the processing overhead associated with selecting the correct ER may be reduced or eliminated, making more of the CPU available for the GVMs themselves in various embodiments. Note that in embodiments in which virtual-to-physical address translation entries are cached at the TLB 124, the page tags (and associated page tag validity indicator information) may also be cached at the TLB.

In some embodiments, page tag-based ER selection techniques may be employed at virtualization servers of a computing service of a cloud provider network. A cloud provider network (sometimes referred to simply as a "cloud" or a cloud computing environment) refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

Figure 2:
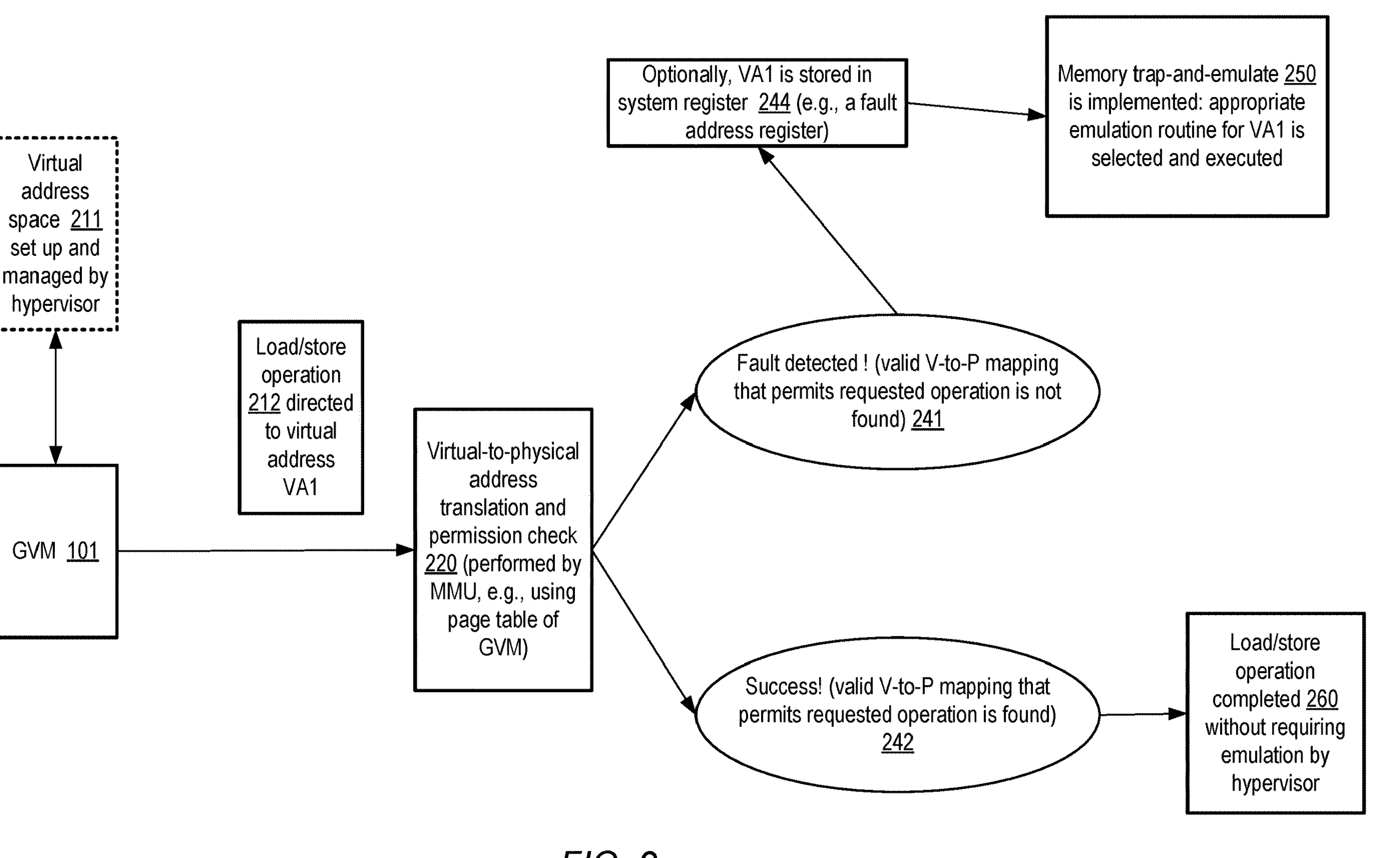
FIG. 2 illustrates an example technique for handling load and store operations on behalf of a guest virtual machine, according to at least some embodiments.

FIG. 2 illustrates an example technique for handling load and store operations on behalf of a guest virtual machine, according to at least some embodiments. In the example scenario depicted in FIG. 2, a virtual address space 211 is set up and managed by a hypervisor for a GVM 101 launched at a VH. A program running within the GVM may initiate a load or store operation 212 directed to a virtual address VA1 within the virtual address space 211.

A virtual-to-physical address translation and permission check 220 may then be performed, e.g., by an MMU of the VH in various embodiments. As part of this operation, the MMU may access and traverse a hypervisor-managed page table set up by the hypervisor for the GVM (the hypervisor may set up respective page tables for each GVM launched on the VH). If the translation and permission check succeeds, as indicated in element 242, i.e., if a valid virtual-to-physical address translation mapping that permits the requested operation by the GVM is found, the load/store operation is completed 260 without requiring an emulation routine of the hypervisor to be executed in the depicted embodiment.

If the translation and permission check does not succeed, i.e., if a valid virtual-to-physical address translation mapping which permits the requested operation is not found (element 241), a memory access fault may be detected by the MMU. In some hardware architectures, the fault-causing virtual address VA1 may be stored in a system register 244 (such as a fault address register). A memory trap-and-emulate (MTAE) operation 250 may be implemented as a result of the fault, in which the appropriate ER for VA1 is selected and executed. In some conventional approaches, the hypervisor may read VA1 from the system register and perform computations using VA 1 to determine the ER to run. In at least some embodiments, the selection of the emulation may be made more efficient using page tags of the kind introduced above. In at least some embodiments in which page tags are used, the MMU may nevertheless store the fault-causing virtual address in the system register, even though the virtual address may not be used directly for ER selection as in the conventional approaches. In at least one embodiment, for some types of MTEAs, page tags may not be used, and the stored fault-causing address may be used to look up the ER within the hypervisor; that is, the system register 244 may support a fallback mechanism for scenarios in which page tags are not used, or cannot be used.

FIG. 3 illustrates an example multi-level page table which may be traversed frequently by a hardware memory management unit (MMU) of a computer system to perform virtual-to-physical address translation, according to at least some embodiments. The concepts illustrated in FIG. 3 and FIG. 4 apply to hypervisor-managed page tables in various embodiments. A translation table base register (TTBR) 302 may point to a level 1 table entry 310 of the page table. The level 1 table may comprise some number of memory block descriptors (such as BD 312A) (where a block comprises more than one page) and one or more table descriptors (such as TD 314A) pointing to lower levels of the page table.

In the scenario depicted in FIG. 3, a1, a2 and a3 represent respective portions of a virtual address (at different offsets within the bit sequence of the virtual address) which are used as indexes to traverse entries at different levels of the page table to determine the physical (or "physical") memory page to which the virtual address is mapped. For example, a1 may be used to access TD 314A, which points to level 2 table entry 320. Level 2 table entry may comprise BD 312B and TD 314B. Within level 2 table entry 320, a2 may be used to identify TD 314B, which points to level 3 table entry 330. Within the level 3 table entry, a3 may point to page descriptor 316, which points to the target page 342 within the memory pages 340 of the computing device or GVM for which the page table is used. At least some contents of the hypervisor-managed page table entries at various levels may be written or populated by memory management components of the hypervisors of the kind discussed above in various embodiments e.g., as part of the preparatory tasks of the hypervisor for launching a new GVM.

Figure 4:
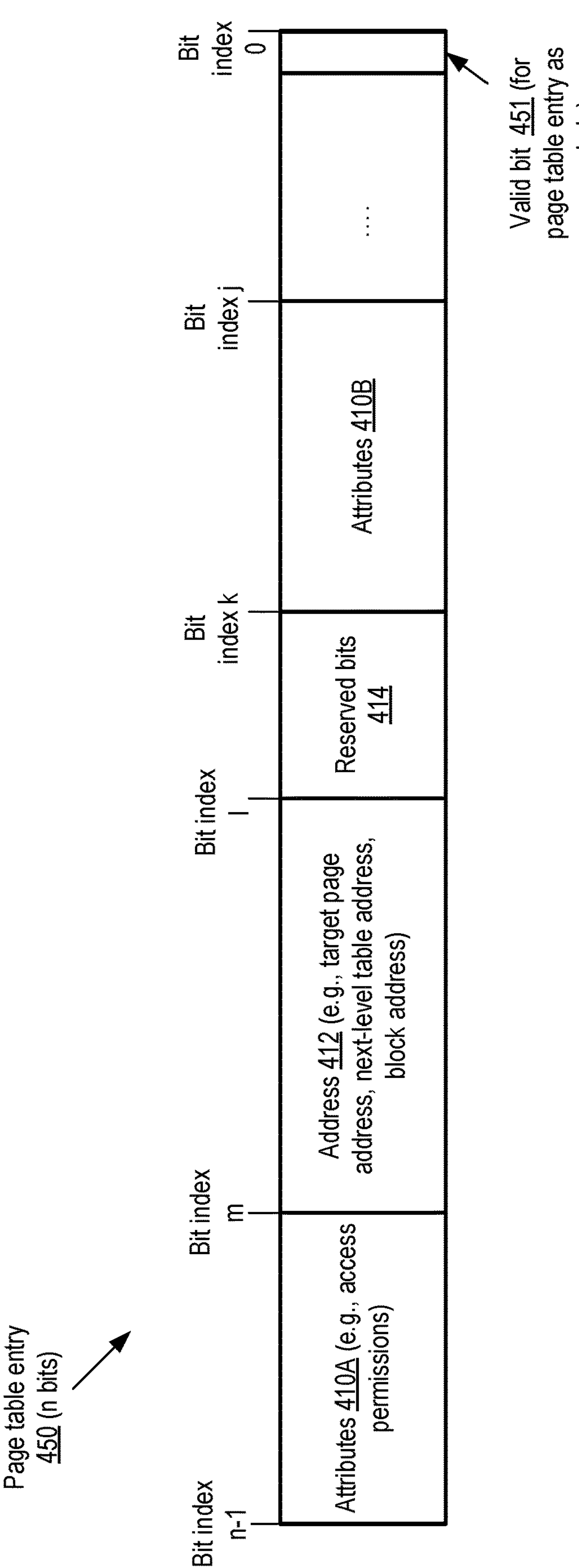
FIG. 4 illustrates example contents of a page table entry, according to at least some embodiments.

FIG. 4 illustrates example contents of a page table entry, according to at least some embodiments. In the example shown, page table entry 450 comprises n bits, with bit indexes starting at 0 at the right end of the entry and leading up to index (n−1) at the left end. In some embodiments, one of the bits of the page table entry (such as the bit at index 0) may be designated as a valid bit 451 for the page table entry as a whole. If a value of 0 is stored in this bit, this may in indicate that the page table entry 450 as a whole is invalid, while a value of 1 may indicate that the remaining bits of the page table entry are also valid. Address 412, stored in bit index range 1 through m, may for example comprise a page address, the address of an entry of the next level in the table, or the address of a block (rather than a page) of memory, where a block can comprise multiple pages.

In page table entry 450, a first set of attributes 410A of the portion of memory being managed using the entry 450 is stored in bit index range m through (n−1), while a second set of attributes 410B is stored in bit index-range j through k. The attributes may for example indicate access permissions for the memory at the address 412. The bits between index k and index 1 have been designated as reserved bits 414 (i.e., bits that can be used in custom ways without violating the architecture) in the hardware architecture specification of the computing device whose page table entry 450 is shown. Other types of data may be stored between index 0 and index j in the depicted embodiment. Note that the architecture may in general specify different layouts (e.g., different subsets of bits being used for addresses vs. attributes) at respective layers of a multi-layer page table. In at least some embodiments, as indicated below, reserved bits 414 may be used by a hypervisor to store page tags and associated validity information.

Figure 5:
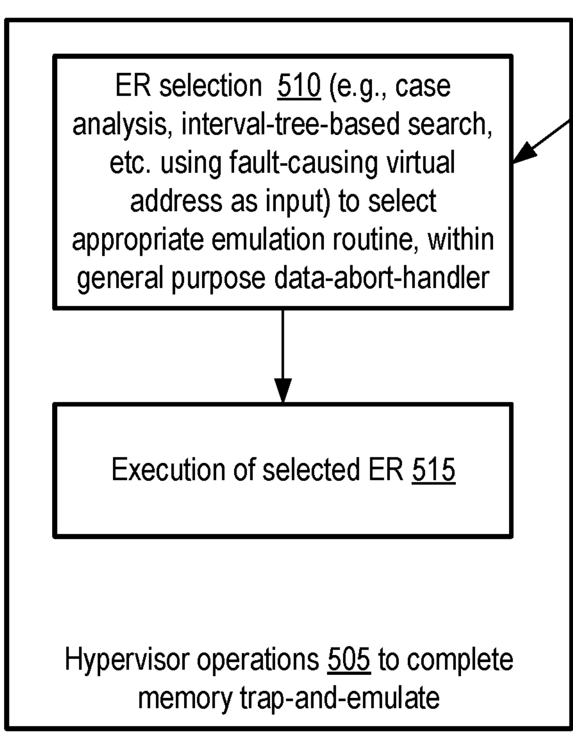
FIG. 5 illustrates examples of sub-tasks that may be performed at a hypervisor for trap-and-emulate operations, according to at least some embodiments.

FIG. 5 illustrates examples of sub-tasks that may be performed at a hypervisor for trap-and-emulate operations, according to at least some embodiments. The set of hypervisor operations 505 that are performed for a memory trap-and-emulate in the depicted embodiment can broadly be divided into two categories: ER selection 510, and execution of the selected ER 515.

A respective range of virtual memory addresses may be assigned or mapped by the hypervisor, e.g., when setting up the virtual memory for a GVM, to each type of hardware device for which an ER may be needed. When a GVM initiates a load or store operation directed to a virtual address, and a valid virtual-to-physical mapping for the requested operation is not found, the ER which is to be executed may have to be found by first determining the specific memory address range (among the ranges assigned/mapped by the hypervisor) to which the virtual memory address belongs. For example, consider a trivial scenario in which virtual memory address range R1 of a GVM GVM1 is assigned to a first hardware device for which an ER ER1 is to be used for emulation, and virtual memory address range R2 of GVM1 is assigned to a second hardware device for which an ER ER2 is to be used for emulation. If the virtual address VA1 which leads to a fault lies within R1, ER1 may have to be invoked as part of the MTAE, and if VA1 lies within R2, ER2 may have to be invoked.

In some conventional approaches, as indicated earlier, an MMU that detects or encounters a memory fault when it is attempting to find a valid virtual-to-physical address translation with the permissions needed for a GVM-initiated operation may store the fault-causing or fault-inducing virtual address in a location accessible to the hypervisor, such as a system register called a fault address register. To perform ER selection 510, the hypervisor may then read the virtual address, and perform a computation (e.g., within a data-abort-handler routine or the equivalent) to which the virtual address is provided as input. The virtual address based computation may, for example, utilize the case construct available in many programming languages, or may utilize an interval tree search. For a scenario in which there are n ERs from which one has to be selected, the case based lookup approach may require O(n) units of computation, while an interval trees search may use O(log(n)) units of computation.

Regardless of the specific technique used for ER selection 510, the selected ER may have to be executed to complete the MTAE in various embodiments. In at least some embodiments, as indicated earlier, the overhead 566 associated with selecting the ER can potentially be reduced using page tags by eliminating the requirement for the hypervisor to perform computations using virtual addresses. Two example approaches involving the use of page tags are described below in further detail.

Figure 6:
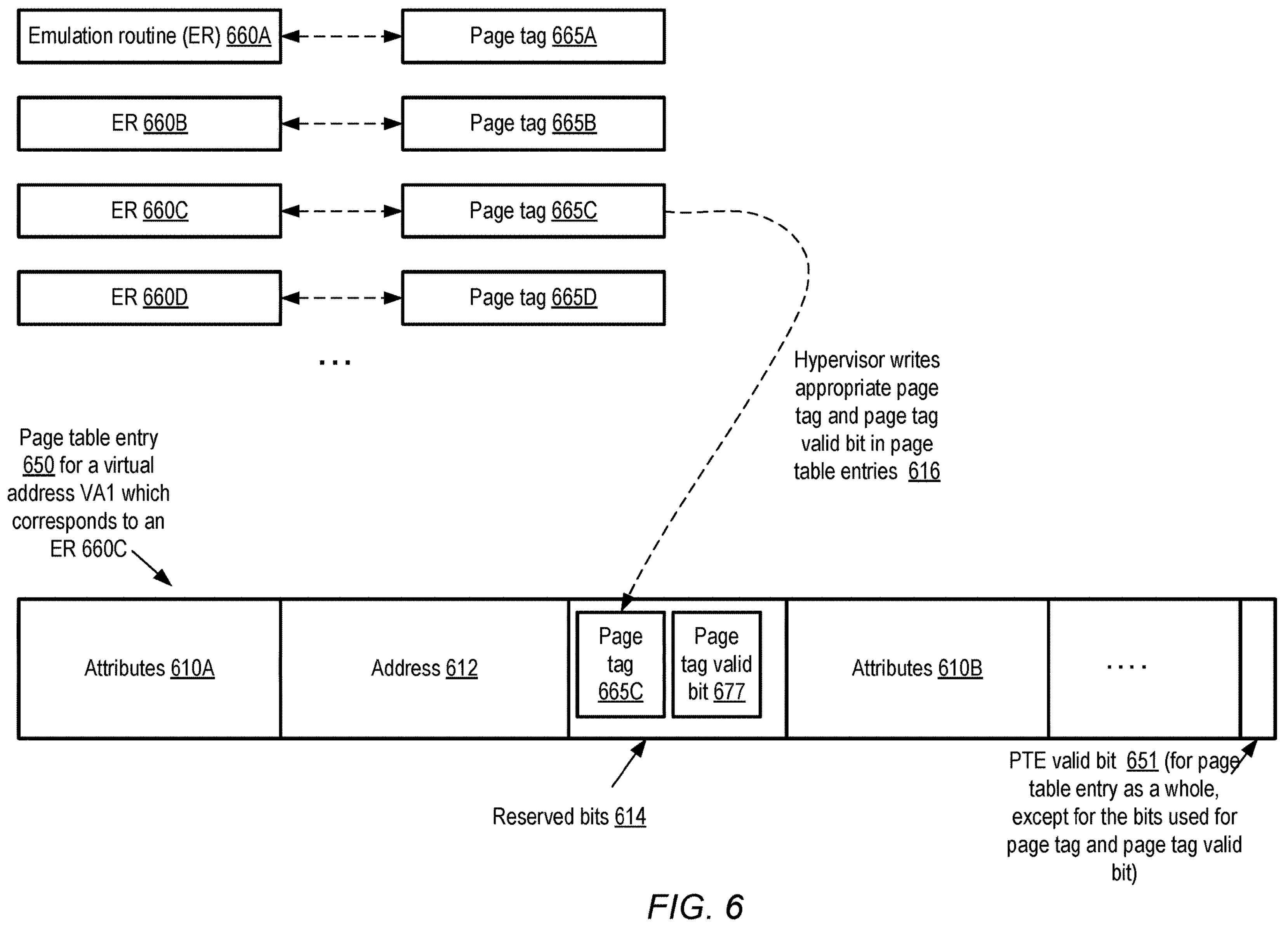
FIG. 6 illustrates a scenario in which page tags and associated page tag valid bits may be stored within page table entries, according to at least some embodiments.

FIG. 6 illustrates a scenario in which page tags and associated page tag valid bits may be stored within page table entries, according to at least some embodiments. In the depicted embodiment, the hypervisor of a VH comprises at least four ERs: ER 660A, ER 660B, ER 660C and ER 660D. Each of the ERs has a distinct page tag 665 associated with it (i.e., within the hypervisor code, individual ERs are mapped to respective page tags). ER 660A is mapped to page tag 665A, ER 660B is mapped to page tag 665B, ER 660C is mapped to page tag 665C, and ER 660D is mapped to page tag 665D.

A page table entry 650 (part of a hypervisor-managed page table) for a virtual address VA1 is shown. Memory access faults associated with VA1 are to lead to the execution of ER 660C in the depicted example. Page table entry 650 includes attributes sections 610A and 610B, an address section 612, a PTE (page table entry) valid bit 651 for the page table as a whole (apart from the bits used for storing a page tag and a page tag valid bit), and a set of reserved bits 614 in the depicted embodiment. During its setup of the page table, the hypervisor may store page tag 665C and a page tag valid bit 677 using the reserved bits in some embodiments, as indicated by arrow 616. In other embodiments, portions of the attributes sections 610A or 610B (which may also include permissions settings) may be used instead of or in addition to using the reserved bits. The page tag valid bit may be used by the hypervisor to indicate whether a valid page tag is present in the set of bits designated to store page tags; in effect, the page tag valid bit may be used as the equivalent of an on/off switch indicating whether the page tag based approach towards MTAEs is to be used for the virtual address or not in the depicted embodiment. If the value stored in the page tag valid bit indicates that the page tag is invalid, a conventional approach in which computations using VA1 are performed within the hypervisor to select the ER may be used in some embodiments. If the value stored in the page tag valid bit indicates that the page tag is valid, one of the approaches discussed below may be employed to select the ER 660C without performing address-based computations in the hypervisor.

Note that in various embodiments, some types of MTAEs may be needed if the MMU finds (e.g., using the PTE valid bit) that the page table entry is invalid (e.g., if the GVM is trying to address a portion of its virtual memory for which the hypervisor has not yet created a mapping in the hypervisor-managed page table). In such scenarios, the PTE valid bit 651 may indicate that the page table entry (apart from the page tag-related bits) is invalid, but the page tag valid bit may be used to indicate that the page tag portion of the PTE is valid.

Figure 7:
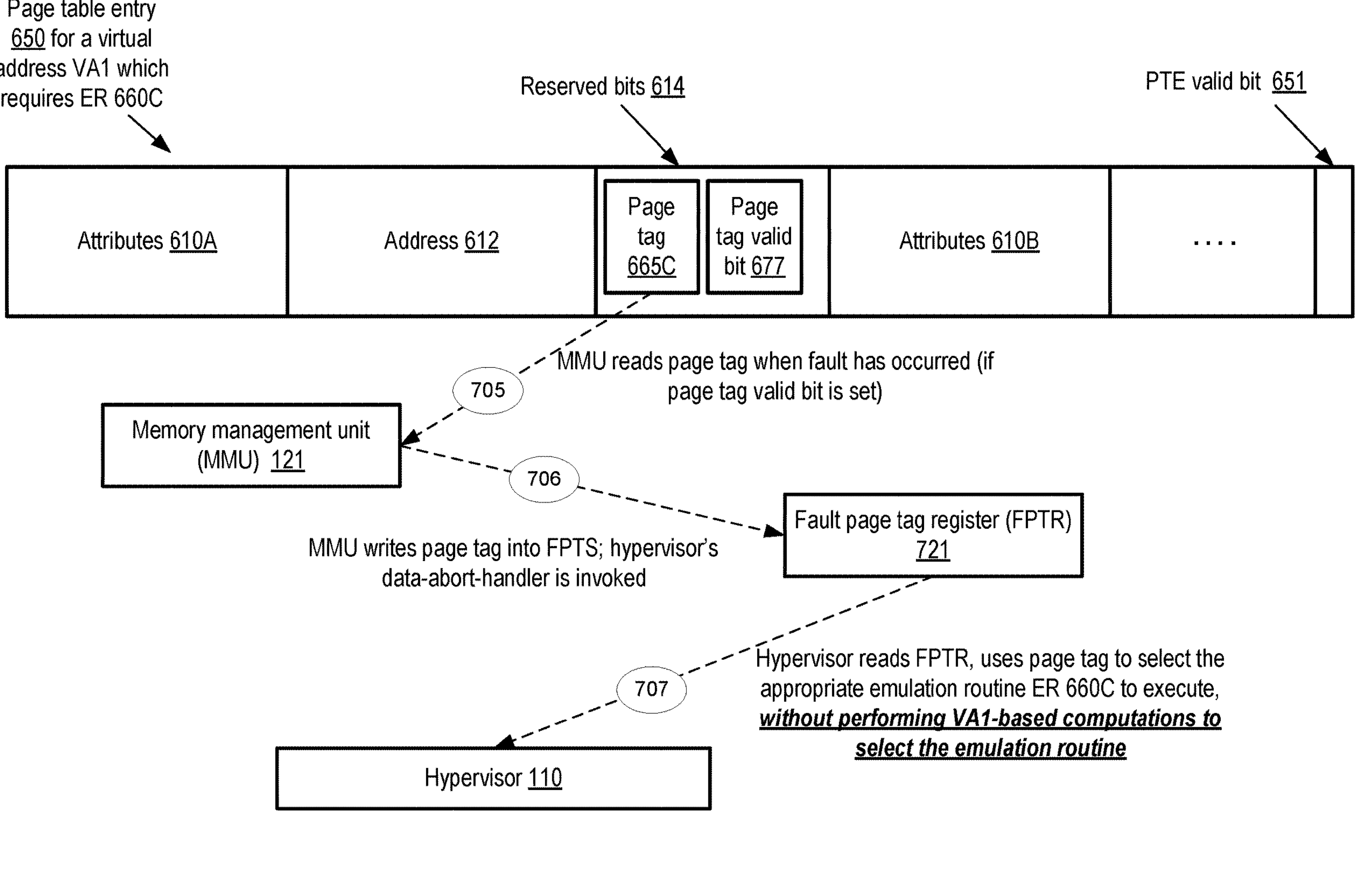
FIG. 7 illustrates an example technique in which a fault page tag register populated by a memory management unit (MMU) may be read by a hypervisor to determine a page tag associated with a particular memory access fault, according to at least some embodiments.

FIG. 7 illustrates an example technique in which a fault page tag register populated by a memory management unit (MMU) may be read by a hypervisor to determine a page tag associated with a particular memory access fault, according to at least some embodiments. In the embodiment depicted in FIG. 7, page table entry 650 (which was also shown in FIG. 6) may be accessed by an MMU 121 during the MMU's traversal of a hypervisor-managed page table in an attempt to find a valid virtual-to-physical address translation for virtual address VA1 to which an access has been initiated from a GVM. The MMU may discover that a valid translation that permits the requested operation is not available in the page table, that is, that a memory access fault has occurred. The fault may be detected by the MMU in several ways in different embodiments. For example, the MMU may detect the fault if the PTE valid bit 651 indicates that the PTE (apart from the page tag and page tag valid bits, which may indicate that the page tag itself is valid) is invalid. In another example, the MMU may detect the fault if the PTE valid bit indicates that the page table entry 650 is valid, but a permission required for the operation requested by the GVM is not granted in the attributes 610A or 610B.

After the MMU 121 detects that a memory access fault has occurred, the MMU may examine the page tag valid bit 677 to determine whether the page tag 665C is valid in the depicted embodiment. If the page tag 665C is valid, the MMU may read the page tag 665C (as indicated by arrow 705) and write the page tag (arrow 706) into a system register, accessible by the hypervisor, called a fault page tag register (FPTR) 721. Control may then be passed (e.g., by a control unit of a processor of the VH at which the GVM and hypervisor are running) to the hypervisor's data abort handler routine in at least some embodiments. The hypervisor 110 may then read the page tag from the FPTR (arrow 707), and use the page tag to select (e.g., using a simple case statement which does not require computations on the faulting virtual address to be executed within the hypervisor) the appropriate ER 660C to execute in various embodiments. The selected ER may then be executed. In at least one embodiment, if the page tag valid bit 677 indicates that a valid page tag is not present in the page table entry, the traditional approach in which a data abort handler performs virtual address based calculations to identify the ER which is to be executed may be used.

Figure 8:
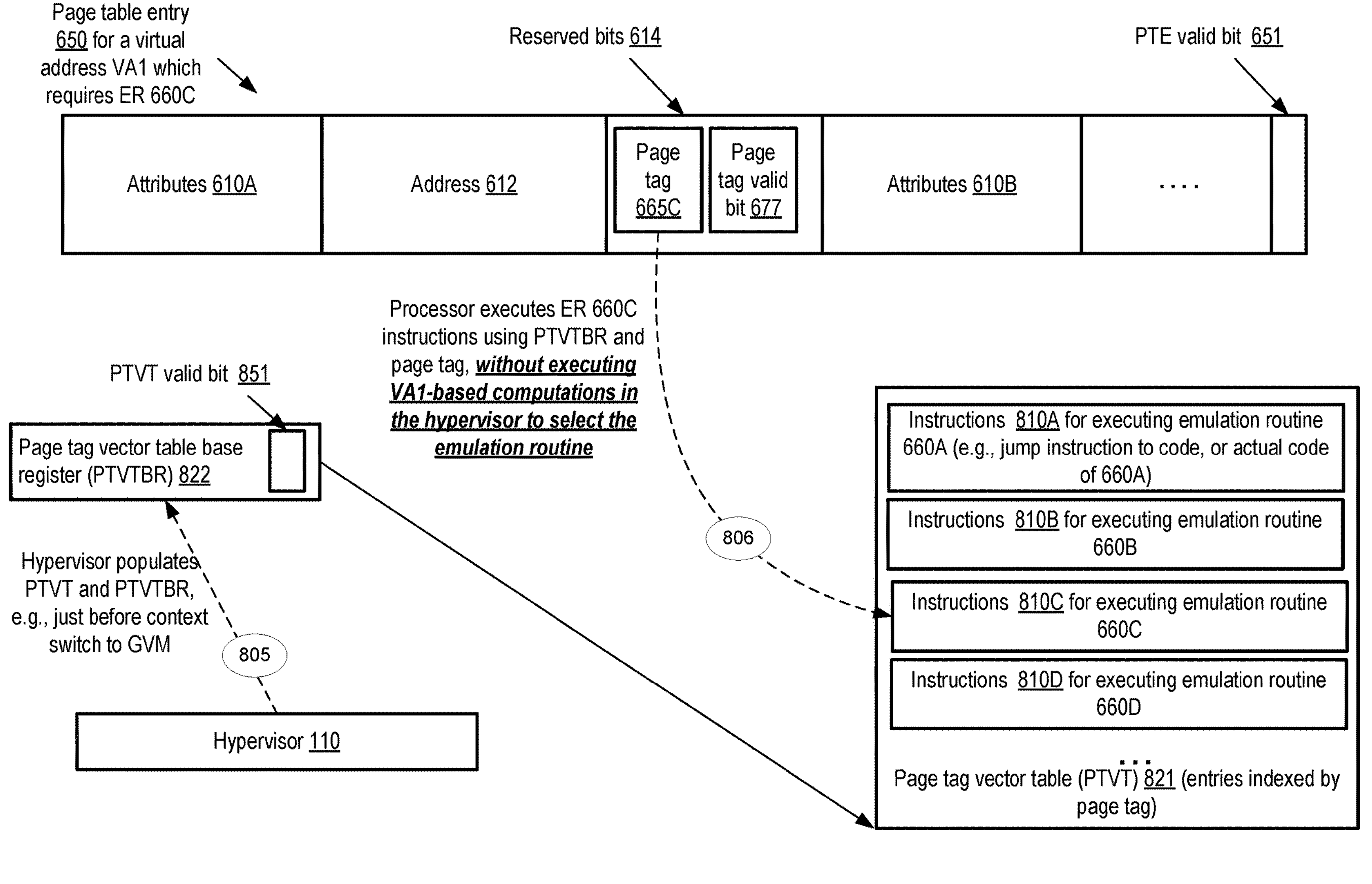
FIG. 8 illustrates an example technique in which a page tag vector table may be employed to handle memory access faults which require execution of emulation routines, according to at least some embodiments.

In an alternative approach which also uses page tags to reduce MTAE overhead, a vector table may be employed instead of performing page tag based computations within the hypervisor to select ERs. FIG. 8 illustrates an example technique in which a page tag vector table may be employed to handle memory access faults which require execution of emulation routines, according to at least some embodiments. In the embodiment depicted in FIG. 8, a hypervisor 110 may populate a data structure called a page tag vector table (PTVT) 821 corresponding to a GVM, e.g., prior to a context switch to the GVM. The PTVT 821 may include several entries, with each vector table entry indexed by (i.e., pointed to) by a respective page tag. For example, consider a scenario in which there are four ERs ER0, ER1, ER2 and ER3 from which one needs to be selected for a given memory access fault, and the corresponding page tags are assigned values 0, 1, 2 and 3. Four vector table entries may be created by the hypervisor in this scenario, with the first entry (at index 0 within the PTVT) corresponding to page tag 0, the second entry corresponding to page tag 1, and so on. Each PTVT entry may include a respective set of one or more executable instructions for initiating the corresponding ER. The executable instructions may comprise a simple jump or branch instruction to at least a portion of the executable code of the corresponding ER in some implementations. In other implementations, at least a portion of the executable code of the ER may itself be stored within the corresponding PTVT entry, so no additional branch may be needed to execute the ER. In the example scenario shown in FIG. 8, instructions 810A for initiating execution of ER 660A may be stored in one PTVT entry, instructions 810B for initiating execution of ER 660B may be stored in another PTVT entry, instructions 810C for initiating execution of ER 660C may be stored in a third PTVT entry, and instructions 810D for initiating execution of ER 660D may be stored in a fourth PTVT entry. Note that in various embodiments, the PTVT set up by the hypervisor for a given GVM may differ from the PTVT set up by the hypervisor for a different GVM running on the same host—e.g., the set of devices to be emulated may differ from one GVM to another, so the number and contents of PTVT entries may also differ from one GVM to another.

In at least some embodiments, after creating or populating the PTVT 821 within a selected portion of the virtualization host's memory, the hypervisor 110 may store the starting address of the PTVT within a system register referred to as a page tag vector table base register (PTVTBR) 822, as indicated by arrow 805. In one embodiment, the PTVTBR may include a PTVT valid bit 851 (also set by the hypervisor 110), indicating whether the bits of the PTVTBR that can be used for a starting address of the PTVT actually include a valid starting address. The PTVT valid bit may in effect be used as a signal to indicate (by the hypervisor), to the processor of the virtualization host, whether the vector table based technique is being used or not. In some embodiments, if the vector table based technique is not being used, the traditional approach in which a data abort handler performs virtual address based calculations to identify the ER which is to be executed may be used.

In the example scenario shown in FIG. 8, page table entry 650 (which was also shown in FIG. 6 and FIG. 7) may be accessed by an MMU 121 during the MMU's traversal of a hypervisor-managed page table in an attempt to find a valid virtual-to-physical address translation for virtual address VA1 to which an access has been initiated from a GVM. If a memory access fault occurs, the page tag valid bit 677 in the page table entry 650 may be read by the MMU to determine whether the page tag 665C is valid. If the page tag is valid, and if the PTVTBR indicates that the vector table technique is being used, a control unit of the processor may utilize the PTVTBR to find the base or starting address of the PTVT which was populated by the hypervisor for the GVM. The control unit of the processor may use the page tag 665C stored in the page table entry 650 as an index into the PTVT, as indicated by arrow 806. The executable instructions in the PTVT entry indexed by the page tag may then be run. If the page tag is not valid, or if the PTVT valid bit indicates that the PTVTBR is not valid, in some embodiments, as a fallback the traditional approach in which a data abort handler performs virtual address based calculations to identify the ER which is to be executed may be used. Using the vector table may result in an even greater reduction in overhead associated with MTAEs than using the approach illustrated in FIG. 7, in that zero instructions may have to be executed within the hypervisor to select an ER in the vector table-based approach, while a few computations using page tables may have to be executed in the hypervisor to select the ER in the approach illustrated in FIG. 7.

FIG. 9 is a flow diagram illustrating aspects of example tasks that may be performed to handle memory trap-and-emulate operations without using virtual address based computations at a hypervisor to select emulation routines, according to at least some embodiments. As shown in element 902, a hypervisor may be launched at a VH, such as a host used to implement compute instances for customers of a virtualized computing service at a cloud computing environment. The hypervisor may include several ERs used to perform virtualization-related tasks triggered by operations initiated by GVM run at the VH. The tasks may require a privilege level granted to the hypervisor but not to the GVMs. In effect, the emulation routines may be used by the hypervisor to execute tasks on behalf of the GVMs, such as tasks requiring access to hardware subcomponents of the VH to which the GVMs are not granted permission for direct access. In some embodiments, respective ERs may contain code used to access, or associated with, respective hardware subcomponents of the VH, such as UARTs, PCI devices, and the like.

The hypervisor may launch a GVM GVM1 at the VH in the depicted embodiment (element 905), e.g., in response to a command or request received at the hypervisor from an administrator or user of the VH, or in response to a command or request sent to the hypervisor from a control plane or administrative server of a virtualized computing service on behalf of a client of the service. Prior to launching GVM1, in at least some embodiments, the hypervisor may complete a set of preparatory tasks, which may include setting up a guest page table (also referred to as a hypervisor-managed page table) whose entries can be used to determine virtual-to-physical address translation mappings for GVM1. In at least some embodiments, the hypervisor may store page tags in at least some leaf-level entries of the guest page table, with each page tag corresponding to a respective ER which is to be executed when memory access faults occur.

At some point after it is launched, GVM1 (i.e., a program running within GVM1) may initiate an operation Op1 that requires access to a particular virtual address VA1 within the virtual address space of GVM1 (element 908). Op1 may comprise a load or store instruction directed to VA1, for example, and may be initiated by an operating system if GVM1 or an application program running within GVM1.

In response to the initiation of the operation, an MMU of a processor of the VH may traverse the guest page table entries and discover that a valid virtual-to-physical address translation mapping for VA1 which permits Op1 is not present in the depicted embodiment (element 911). The page tag that was stored in a page table entry associated with VA1 (e.g., a page table entry within which a valid entry with the required permissions would have been found if it existed) may be obtained, and used to perform a task of an emulation routine ER1 corresponding to VA1 (element 914). ER1 may be selected from among the multiple ERs of the hypervisor without performing VA1-based computations or analysis (e.g., case analysis or interval tree lookups to which VA1 is provided as an input) at the hypervisor in various embodiments.

Figure 10:
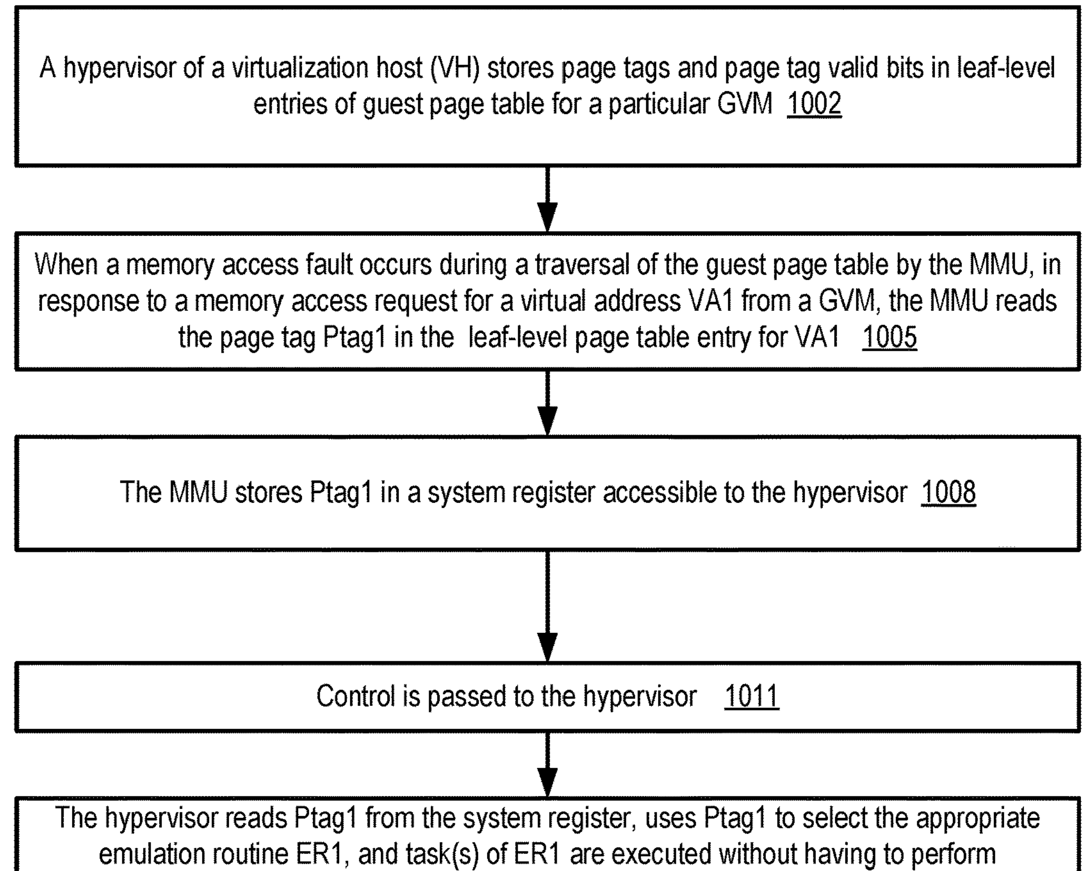
FIG. 10 is a flow diagram illustrating aspects of an example technique in which a hypervisor obtains a page tag associated with a memory trap-and-emulate operation from a system register into which a memory management unit writes the page tag upon detecting a memory access fault, according to at least some embodiments.

FIG. 10 is a flow diagram illustrating aspects of an example technique in which a hypervisor obtains a page tag associated with a memory trap-and-emulate operation from a system register into which a memory management unit writes the page tag upon detecting a memory access fault, according to at least some embodiments. As shown in element 1002, a hypervisor of a virtualization host (VH) may store page tags associated with respective emulation routines (ERs), along with page tag valid bits, in the appropriate leaf-level entries of a hypervisor-managed guest page table for a particular GVM running at the VH. For example, if a particular leaf-level entry LLE1 would be reached by an MMU of the VH during the MMU's attempt to find a valid virtual-to-physical address translation mapping for a virtual address VA1, and a memory access fault for VA1 is to be handled using an ER ER1 to which a page tag Ptag1 is mapped, the hypervisor may store Ptag1 in LLE1. The page tags and corresponding page tag valid bits may be stored in some embodiments at the time that the hypervisor populates the page table as part of the preparatory tasks for launching the GVM. Note that only those leaf-level page table entries which when accessed may lead to a memory access fault that requires execution of an ER may be populated with page tags in some embodiments; that is, some of the page table entries may not contain valid page tags, and their page tag valid bits may be set accordingly. In some embodiments, by default, the page tag valid bit of all leaf-level page table entries may be set to indicate that the corresponding page tag bits do not contain a valid page tag; only those page table entries whose memory faults may lead to execution of ERs may be populated with valid page tags by the hypervisor. In some implementations, page tags and associated valid bits may be stored by the hypervisor in non-leaf entries of a page table, e.g., in addition to or instead of storing them in the leaf-level entries.

When a memory access fault occurs during a traversal of the guest page table by the MMU in response to a memory access request (e.g., a load or store) for a virtual address VA1 from a GVM, the MMU may read the page tag Ptag1 in the leaf-level page table entry for VA1 in the depicted embodiment (element 1005). The page tag valid bit may also be examined by the MMU to verify that Ptag1 is valid in various implementations.

If Ptag1 is valid, the MMU may copy or store Ptag1 in a system register accessible to the hypervisor in the depicted embodiment (element 1008). In at least some embodiments, if Ptag1 is not valid, as a fallback VA1 may be stored in another register (such as the fault address register) accessible to the hypervisor and the hypervisor may perform computations on VA1 to select the ER to run.

Control may then be passed to the hypervisor (element 1011), e.g., to an optimized version of a data abort handler which is programmed to use page tag. The hypervisor may read Ptag1 from the system register into which the MMU copied Ptag1 (element 1014). The hypervisor may use Ptag1 to select the appropriate ER ER1 for handling the fault that has just occurred, without having to perform computations using VA1 to select the ER. ER1 may then be executed at the hypervisor to complete the tasks required by the GVM's attempted access to VAL.

FIG. 11 is a flow diagram illustrating aspects of an example technique in which page tags and a vector table are used to execute emulation routines of a hypervisor, according to at least some embodiments. As shown in element 1102, a hypervisor of a VH may store page tags associated with respective ERs of the hypervisor, along with page tag valid bits, in the appropriate leaf-level entries of a hypervisor-managed guest page table for a particular GVM running at the VH, using logic similar to that discussed above in the context of element 1002 of FIG. 10.

Just before context is switched to a particular GVM launched at the VH, the hypervisor populates a page tag vector table (PTVT) whose entries are indexed by page tags associated with respective ERs (element 1105). Each PTVT entry may include one or more executable instructions for at least initiating the corresponding ER. For example, in some cases the ER entry may comprise a branch or jump instruction whose execution causes the executable code of the corresponding ER to be executed; in other cases the ER entry may itself contain at least a portion of the executable code of the corresponding ER. In various embodiments, before context is switched to the GVM, the hypervisor may also populated a system register (such as PTVTBR 822 of FIG. 8) with a base address of the PTVT (element 1108). A PTVT valid bit may also be set in some implementations by the hypervisor to indicate whether the vector table based approach to MTAEs is to be used.

If and when a memory access fault occurs during a traversal of the guest page table by the MMU of the VH in response to a memory access request for a virtual address VA1 from the GVM to which context is switched, the MMU may read the page tag Ptag1 in the leaf-level page table entry for VA1 in various embodiment (element 1111).

The page tag Ptag1, the system register into which the base address of the PTVT set up for the GVM was stored, and the PTVT may be used to execute the code of the appropriate ER for the memory access fault in the depicted embodiment (element 1114). For example, Ptag1 may be used as an index to find (starting from the base address) the entry of the PTVT which contains executable instructions for initiating the tasks performed within the ER, and a control unit or front-end unit of the processor may cause the executable instructions within the selected PTVT entry to be executed. In at least some embodiments in which the vector table approach is used, no instructions may be required to be executed at the hypervisor to select the ER.

It is noted that in various embodiments, some of the operations shown in the flow diagrams of FIG. 9, FIG. 10 and/or FIG. 11 may be implemented in a different order than that shown in the figure, or may be performed in parallel rather than sequentially. Additionally, some of the operations shown in FIG. 9, FIG. 10 and/or FIG. 11 may not be required in one or more implementations.

In some embodiments, the VH at which page tag-based MTAEs of the kind described above are implemented may be a part of a fleet of VHs of a virtualized computing service (VCS) of a cloud computing environment or cloud provider network. In one embodiment, the VCS may provide its customers access to several categories of compute instances or GVMs. One or more categories of the compute instances may be launched at VHs at which page tag-based techniques are supported, while others may be launched at VHs at which page tag-based techniques are not supported. Customers of the VCS may be given the option of requesting (e.g., via parameters of programmatic compute instance launch requests submitted to the control plane of the VCS) compute instances with support for page tag-based MTAEs in some embodiments. When a request for a compute instance for which page tags are to be used for selecting ERs is received, that compute instance may be launched at a VH of a host which supports the page tag-based techniques introduced herein. IN at least one embodiment, the page tag-based techniques may be implemented using VHs that are not part of a cloud provider network.

Figure 12:
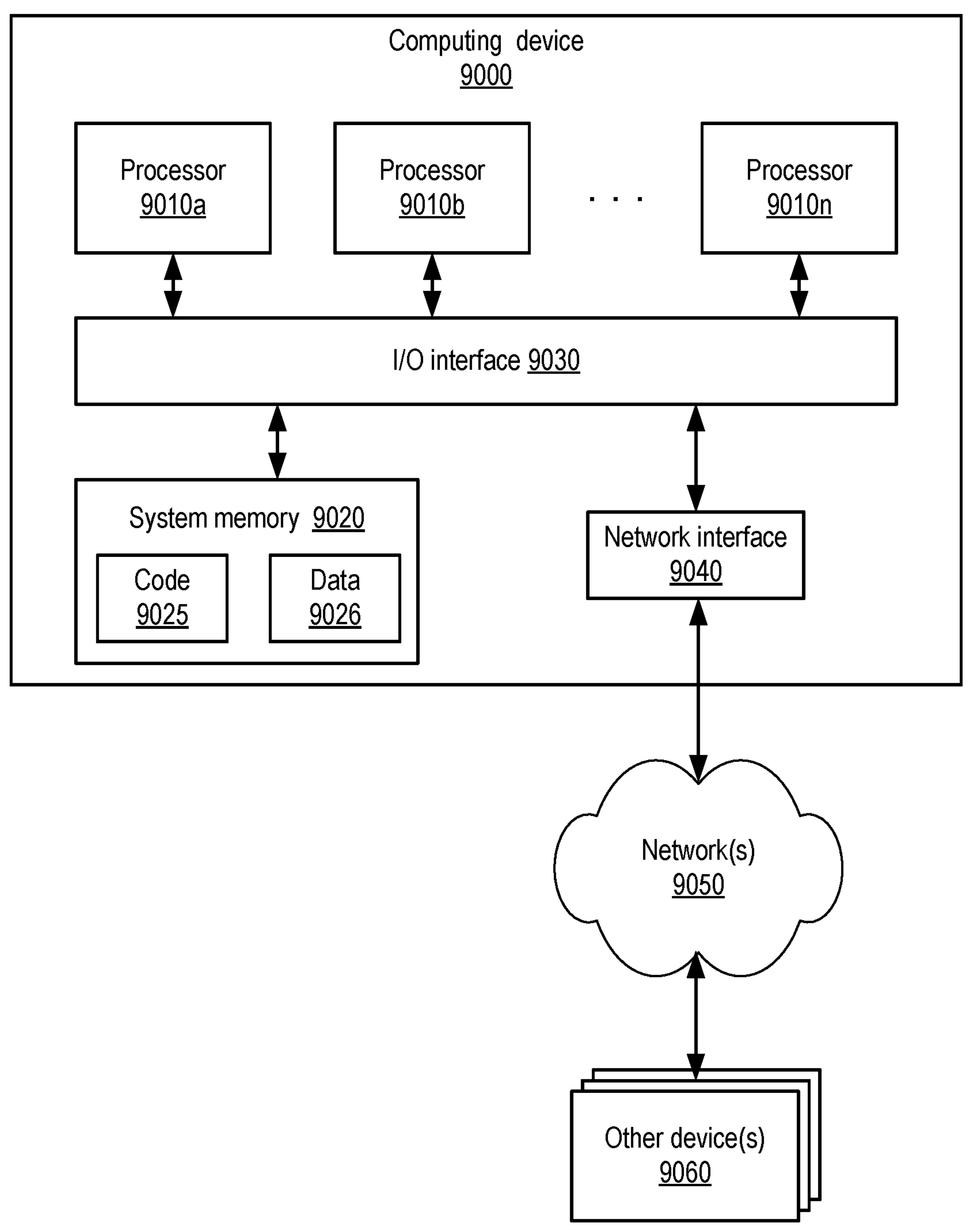
FIG. 12 is a block diagram illustrating an example computing device that may be used in at least some embodiments.

In at least some embodiments, a server that implements the types of techniques described herein (e.g., page tag-based selection of emulation routines of a hypervisor) may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/ output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:

launching, at a virtualization host, a hypervisor comprising a plurality of emulation routines, wherein individual ones of the emulation routines are used to perform respective tasks triggered by operations initiated at one or more guest virtual machines launched at the virtualization host, wherein the respective tasks require a privilege level which is granted to the hypervisor and not granted to the one or more guest virtual machines, and wherein at least some of the respective tasks are associated with a corresponding hardware subcomponent of the virtualization host;

initiating, by a particular guest virtual machine which was launched at the virtualization host, an operation which requires access to a particular virtual address;

determining, by a memory management unit (MMU) of the virtualization host, that a valid virtual-to-physical address translation mapping for the particular virtual address which grants permission for the operation initiated by the particular guest virtual machine is not present in a set of address translation entries associated with the particular guest virtual machine; and based on (a) the determining by the MMU that the valid virtual-to-physical address translation mapping for the particular virtual address is not present and (b) a page tag associated with the particular virtual address, performing, at the virtualization host, a task using a particular emulation routine of the plurality of emulation routines, wherein the page tag is stored in a particular address translation entry of the set of address translation entries, and wherein the particular emulation routine is executed without the hypervisor utilizing the particular virtual address to select the particular emulation routine from the plurality of emulation routines.

2. The computer-implemented method as recited in claim 1, further comprising:

storing the page tag by the hypervisor in the particular address translation entry.

3. The computer-implemented method as recited in claim 1, further comprising:

reading the page tag by the MMU from the particular address translation entry in response to determining that the valid virtual-to-physical address translation mapping is not present;

storing the page tag by the MMU in a system register of the virtualization host;

reading the page tag from the system register by the hypervisor; and selecting, by the hypervisor, the particular emulation routine from the plurality of emulation routines using the page tag.

4. The computer-implemented method as recited in claim 1, further comprising:

populating, by the hypervisor, a vector table in a memory of the virtualization host, wherein the vector table comprises a plurality of vector table entries indexed by respective page tags, wherein individual ones of the vector table entries comprise executable instructions for initiating execution of respective emulation routines of the plurality of emulation routines, wherein the plurality of vector table entries includes a particular vector table entry corresponding to the particular emulation routine, and wherein the particular vector table entry is indexed by the page tag; and storing, by the hypervisor in a system register, a base address of the vector table.

5. The computer-implemented method as recited in claim 4, further comprising:

reading the page tag by the MMU from the particular address translation entry in response to determining that the valid virtual-to-physical address translation mapping is not present;

accessing, by a control unit of a processor of the virtualization host, the particular vector table entry using (a) the base address of the vector table, obtained from the system register, and (b) the page tag; and causing, at the processor, the task to be performed using one or more executable instructions stored in the particular vector table entry.

6. A system, comprising:

a processor of a host, wherein the processor includes a memory management unit (MMU);

a memory of the host, wherein the memory stores instructions that when executed on the processor:

launch a hypervisor, wherein the hypervisor comprises a plurality of emulation routines, wherein individual ones of the emulation routines are used to perform respective tasks on behalf of one or more guest virtual machines running at the host, and wherein the respective tasks require a privilege level granted to the hypervisor and not granted to the one or more guest virtual machines;

initiate, by a particular guest virtual machine which was launched at the host, an operation which requires access to a particular virtual address; and subsequent to a determination by the MMU that a virtual-to-physical address translation mapping for the particular virtual address which permits the operation initiated by the guest virtual machine is not available, perform a task using a particular emulation routine of the plurality of emulation routines, wherein the particular emulation routine is identified using a page tag associated within the particular virtual address, and wherein the task is performed without using, by the hypervisor, the particular virtual address to select the particular emulation routine from the plurality of emulation routines.

7. The system as recited in claim 6, wherein the memory stores further instructions that when executed on the processor:

store the page tag in a particular address translation entry of a set of address translation entries associated with the particular guest virtual machine.

8. The system as recited in claim 7, wherein the memory stores further instructions that when executed on the processor:

obtain the page tag, at the hypervisor, from a location into which the page tag is stored subsequent to the determination that the virtual-to-physical address translation mapping for the particular virtual address which permits the operation initiated by the particular guest virtual machine is not available; and select, by the hypervisor based at least in part on the page tag, the particular emulation routine from the plurality of emulation routines.

9. The system as recited in claim 8, wherein the MMU is configured to:

read the page tag from the particular address translation entry in response to determining that a virtual-to-physical address translation mapping for the particular virtual address which permits the operation initiated by the guest virtual machine is not available; and store the page tag in the location.

10. The system as recited in claim 8, wherein the location comprises a system register of the host.

11. The system as recited in claim 7, wherein the particular address translation entry comprises an entry of a hypervisor-managed page table, and wherein the page tag is stored using one or more reserved bits of the entry of the hypervisor-managed page table.

12. The system as recited in claim 7, wherein the memory stores further instructions that when executed on the processor:

populate, by the hypervisor, a vector table in a memory of the host, wherein the vector table comprises a plurality of vector table entries indexed by respective page tags, wherein individual ones of the vector table entries comprise executable instructions for initiating execution of respective emulation routines of the plurality of emulation routines, wherein the plurality of vector table entries includes a particular vector table entry corresponding to the particular emulation routine, and wherein the particular vector table entry is indexed by the page tag; and store, by the hypervisor in a system register of the host, a base address of the vector table.

13. The system as recited in claim 12, wherein the MMU is configured to:

read the page tag from the particular address translation entry in response to a determination by the MMU that a virtual-to-physical address translation mapping for the particular virtual address which permits the operation initiated by the particular guest virtual machine is not available; and cause the processor to access the particular vector table entry using (a) the base address of the vector table, obtained from the system register, and (b) the page tag, wherein the task is performed at the processor using one or more executable instructions stored in the particular vector table entry.

14. The system as recited in claim 12, wherein the memory stores further instructions that when executed on the processor:

set, by the hypervisor, a particular bit in the system register to indicate that the vector table is to be used to execute emulation routines at the host.

15. The system as recited in claim 6, wherein the operation which requires access to the particular virtual address comprises one or more of: (a) a read or write operation directed to a Universal Asynchronous Receiver-Transmitter (UART) device, (b) a read or write operation directed to a Peripheral Component Interconnect (PCI) device, or (c) a read or write operation directed to a portion of virtual memory which has not been mapped to physical memory of the host by the hypervisor.

16. One or more non-transitory computer-accessible storage media storing program instructions that when executed on or across one or more processors:

launch a hypervisor at a virtualization host, wherein the hypervisor comprises a plurality of emulation routines, wherein individual ones of the emulation routines are used to perform respective tasks on behalf of one or more guest virtual machines launched at the virtualization host by the hypervisor, and wherein the respective tasks require a privilege level granted to the hypervisor and not granted to the one or more guest virtual machines;

initiate, by a particular guest virtual machine which was launched at the virtualization host, an operation which requires access to a particular virtual address; and subsequent to a determination by a memory management unit (MMU) of a processor of the one or more processors that a virtual-to-physical address translation mapping for the particular virtual address which permits the operation initiated by the particular guest virtual machine is not available, select, using a page tag associated within the particular virtual address, a particular emulation routine of the plurality of emulation routines; and perform a task using the particular emulation routine of the plurality of emulation routines, wherein the task is performed without initiating an analysis using the particular virtual address to select the particular emulation routine from among the plurality of emulation routines.

17. The one or more non-transitory computer-accessible storage media as recited in claim 16, storing further program instructions that when executed on or across the one or more processors:

store, by the hypervisor, a particular page tag corresponding to the particular virtual address in a particular address translation entry of a set of address translation entries associated with the particular guest virtual machine, wherein the particular page tag is the page tag utilized to select the particular emulation routine from among the plurality of emulation routines.

18. The one or more non-transitory computer-accessible storage media as recited in claim 17, storing further program instructions that when executed on or across the one or more processors:

obtain the particular page tag, at the hypervisor, from a location into which the particular page tag is stored by the MMU subsequent to the determination by the MMU that a virtual-to-physical address translation mapping for the particular virtual address which permits the operation initiated by the particular guest virtual machine is not available; and select, by the hypervisor based at least in part on the particular page tag, the particular emulation routine from the plurality of emulation routines.

19. The one or more non-transitory computer-accessible storage media as recited in claim 17, storing further program instructions that when executed on or across the one or more processors:

populate, by the hypervisor, a vector table in a memory of the virtualization host, wherein the vector table comprises a plurality of vector table entries indexed by respective page tags, wherein individual ones of the vector table entries comprise executable instructions for initiating execution of respective emulation routines of the plurality of emulation routines, wherein the plurality of vector table entries includes a particular vector table entry corresponding to the particular emulation routine, and wherein the particular vector table entry is indexed by the particular page tag; and store, by the hypervisor in a system register of the host, a base address of the vector table, wherein contents of the system register and the particular vector table entry are utilized to perform the task using the particular emulation routine.

20. The one or more non-transitory computer-accessible storage media as recited in claim 19, wherein the particular vector table entry includes one of: (a) a jump instruction to a portion of executable code of the particular emulation routine or (b) at least a portion of executable code of the particular emulation routine.

* * * * *